United States Patent Office 2,981,714
Patented Apr. 25, 1961

2,981,714
IMPROVING OZONE RESISTANCE OF BUTYL RUBBERS

Augustus B. Small, Westfield, Leon Sherwood Minckler, Jr., Metuchen, John L. Ernst, Westfield, and Francis P. Ford, Watchung, N.J., assignors to Esso Research and Engineering Company, a corporation of Delaware No Drawing. Filed July 9, 1958, Ser. No. 747,336

14 Claims. (Cl. 260—45.7)

The present invention relates to an improved ozone resistant rubber and, more particularly, to a process for improving ozone resistance by the addition of dimers of cyclic diene hydrocarbons to unsaturated rubbery polymers.

In the past, there has been a considerable problem concerning the effect that ozone has upon natural or synthetic rubbers. Deterioration of rubbers, which unavoidably have unsaturation, is caused chiefly by the action of ozone. Normally, ozone breaks down to form free radicals which attack the double bonds that are present in the rubber chain. Ozone is present in the atmosphere in very small proportions, usually from 1 to 2 parts in 100,000,000 parts of air; but in certain localities the concentration is as high as 92 parts in 100,000,000 parts of air. Even this relatively low concentration of ozone in the air causes rubber to crack, particularly when it is under tension, e.g., in tire casings, rubber bands stretched around papers, and rubber tubing put over laboratory stopcocks. Ozone is also formed when an electric spark occurs in an atmosphere of oxygen, e.g., the ignition system of an automobile. This phenomenon is called corona discharge and causes cracking of rubber which may be in contact with the ozone produced.

There are several methods presently employed to increase the ozone resistance of rubbers. The first method is to add wax to the rubbery compound. Since wax is not soluble in rubber, it will tend to egress to the surface of the material. Therefore, a physical barrier is formed against the ozone. However, this procedure has definite disadvantages: wax will wear off and, although more wax will come to the surface, there may be a period of time when the rubber is exposed to ozone. It should also be noted that, if the rubber is stretched, the wax coating will crack and the ozone will come in contact with the rubber.

Another method used for increasing the ozone resistance is to add certain types of organic compounds to the rubbery material. These compounds, which are known as anti-ozidants, react with the free radical which results from ozone. Therefore, fewer double bonds are attacked by these free radicals and deterioration of the rubber is decreased. The anti-ozidants are generally either secondary aromatic amines or secondary aromatic phenols. Examples of the aromatic amines are diphenyl amine; N.N'-diphenyl-p-phenylenediamine; and di-p-methoxydiphenylamine. However, the addition of these amines to the rubber has a serious disadvantage, for rubber with these anti-ozidant additives will stain and discolor items it comes in contact with, e.g., weather seals for automobile windows, containing these anti-ozidants, will stain the painted surface of the vehicle.

In addition to the amines, secondary aromatic phenols have been used as anti-ozidants. Such phenols include: hydroquinone monobenzyl ether and 4-methyl-6-tert-butyl phenol. However, these phenols are acid materials and when they are used in conjunction with rubber, a corrosive effect will occur. This, therefore, is also a disadvantage for these phenol anti-ozidants.

According to this invention, it has been found that the ozone resistance of unsaturated rubbery polymers can be increased by the addition of dimers of cyclic diene hydrocarbons, e.g., dicyclopentadiene. This method overcomes the disadvantages previously encountered in the utilizatino of waxes and secondary aromatic amines and phenols.

One embodiment of this invention is to add dicyclopentadiene to the rubbery polymer before and/or after curing. For example, the rubber, after it has been prepared, can be compounded with dicyclopentadiene and other materials and cured as desired. However, the prepared rubber can also be compounded with materials, including or excluding dicyclopentadiene, and then cured by various methods. The cured rubber can then be immersed in dicyclopentadiene and dried by any known means.

The rubbery compounds to which this invention is applicable are any unsaturated rubber such as butyl rubber, natural rubber, neoprene, SBR (the copolymer of major amounts of butadiene and minor amounts of styrene), and ABR (the copolymer of butadiene and acrylonitrile). Butyl rubber is preferred. It has excellent ozone resistance initially because of the low unsaturation which it possesses (iodine number less than 50, generally about 1 to 10). However, through the utilization of this invention, it is possible to increase the ozone resistance in butyl rubber to an even greater extent.

The butyl rubber polymer is prepared by reacting 70 to 99.5 parts by weight, preferably 85 to 99.5 of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene.

Mixture of monomers, preferably with 1 to 5 volumes of inert diluent, e.g., methyl chloride, should be cooled to a temperature between 0 and $-200°$ C. and it is preferred that the temperature range be between $-60°$ and $-130°$ C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128.

The butyl rubber, similarly to other rubbers, can be compounded with various other materials. Some example of the types of materials that can be incorporated are as follows: stabilizers, plasticizers, fillers, accelerators, softeners, catalysts, and cross-linking agents. Compounding may be accomplished by subjecting the rubber to a severe mixing treatment in a Banbury mill at a temperature range of 75° F. to 500° F. This drastic treatment homogenizes the polymer and removes foci of impurities. Some compounding ingredients may be added during the working in this mill. The treated polymer can then be worked on an open-roll mill with the addition of other compounding ingredients. The butyl rubber within the scope of this invention includes those which are halogenated, eg., chlorinated and brominated; the preferred range of halogen in the rubber structure is from 0.9 to 1.5 weight percent for chlorinated butyl rubber and 1.5 to 3.0 weight percent for brominated butyl rubber.

The addition of dicyclopentadiene to neoprene has also been effective in increasing its ozone resistance. Neoprene is prepared by polymerizing chloroprene by any known method. One suitable method is described herebelow. The following materials are emulsified together: chloroprene, water, sulfur, sodium hydroxide, sodium salt of naphthylene-sulfonic acid-formaldehyde condensation product, and potassium persulfate. These are polymerized at about 40° C. to form a latex. At the end of the polymerization, an emulsion of tetraethylthiuram disulfide is introduced which acts as a stabilizer. Acetic acid is added to the alkaline latex just before coagulation. Coagulation is accomplished by freezing the surface of a large rotating Bryan-cured drum partially immersed in the latex. The resulting film is stripped from the freeze roll, thoroughly washed with water, squeezed, and dried. The resulting material is flexible, free from odor, light amber in color, and has a specific gravity of 1.23.

The dimers of the cyclic diene hydrocarbons within the purview of this invention, which increase the ozone resistance of rubber, are hydrocarbon dimers of cyclic diolefins as dicyclopentadiene and dimethylcyclopentadiene. However, dicyclopentadiene is preferred. It is critical for the success of this invention to use the dimer of the compound, e.g., dicyclopentadiene. Under normal conditions the boiling point of the monomer is too low and furthermore, the monomer may revert to the dimer. However, the dimer will not polymerize with itself or the rubber. Therefore, the dimer, e.g., dicyclopentadiene, is included in the rubber only as an additive and not as a reactant. In other words, the dimer is only compounded with the rubber and not reacted with it.

Dicyclopentadiene can be prepared by any known means. One method is by cracking petroleum fractions such as kerosene, gas oil, naphtha, etc., in the presence of steam at temperatures about 1000° F. up to 1500° F. to give an unsaturated product stream. The liquid cut boiling between 80° and 350° F. is segregated and subjected to heat soaking at about 220° to 240° F. for 6 to 16 hours to dimerize the cyclic diolefins contained therein followed by separation of the dicyclopentadiene.

In accordance with this invention, the dicyclopentadiene may be added to the rubber in any one of three methods or in any combination of these three methods. The first method is to add the dicyclopentadiene as a compounding agent before the curing operation. This compound may be added to the polymer by Banbury mixing and/or mill mixing. The amount of dicyclopentadiene added is critical and should be in the range from 2 to 20 parts per 100 parts of rubber. Below 2%, no antiozidant action is found; above 20%, excessive plasticizing of the rubber is effected. This method will greatly improve the ozone resistance but will cause a decrease in the physical properties of the vulcanizate. That is, the value of the tensile strength, modulus, and elongation will decrease. This reduction can be largely overcome by selecting the proper curing system.

A second method for the addition of dicyclopentadiene is after the curing step. In this method, the cured rubber is immersed in dicyclopentadiene or an aqueous emulsion thereof. After a period of time the vulcanizate swells, which indicates that the dicyclopentadiene has been absorbed in the rubber. After immersion, the rubber is allowed to dry and contract to its former shape. The immersing solution heretofore described may contain 5 to 100% dicyclopentadiene and 95 to 0% water. The time will generally fall within the range of 1 minute to 3 hours, depending on temperature and pressure. A temperature below 170° C. may be used, but room temperature is satisfactory. Pressure above atmosphere may be utilized in order to accelerate the process but will fall within the range of 1 to 10 atmospheres. Any known procedure can be used to dry the immersed rubber. The preferred procedure is air drying at a range of 60° to 350° F. for about 1 to 16 hours. This after-cure method increases the ozone resistance of rubber and there is better retention in the physical properties. That is, the tensile strength, modulus, and elasticity are not decreased as much as when dicyclopentadiene is compounded with the rubber prior to curing.

The dicyclopentadiene can also be added by a third method which is somewhat similar to the first method described above. However, in this method the dicyclopentadiene is added before curing to preferred cure systems. This method will also increase the ozone resistance but will also retain the physical properties, e.g., tensile strength, modulus, and elongation. Some of the preferred cure systems are below:

PARAQUINONE DIOXIME CURE

Paraquinone dioxime in conjunction with lead oxide is an effective curing agent. The chemical reactions in the vulcanization of the polymer appear to comprise the formation of aromatic nitroso groups which in turn react with the unsaturated units in the polymer chain, e.g., isoprene. Some sulfur may be added to improve product quality and aging resistance. The preferred parts per 100 parts of rubbery polymer are as follows: 1.0 to 8.0 parts paraquinone dioxime, 5.0 to 20 parts lead oxide, and 0 to 4.0 parts sulfur. Other materials may be added which include fillers, e.g., carbon black; accelerators, e.g., zinc oxide; and softeners, e.g., zinc stearate.

PARAQUINONE DIOXIME DIBENZOATE CURE

The chemical reaction of this quinone in conjunction with lead is similar to that of paraquinine dioxime. Sulfur may be added to improve aging resistance. The preferred parts per 100 parts of rubbery polymer are as follows: 1.0 to 10 parts paraquinone dioxime dibenzoate; 5 to 10 parts lead oxide and 0 to 4.0 parts sulfur. Other materials may be added which include fillers, e.g., carbon black; accelerators, e.g., zinc oxide; and softeners, e.g., zinc stearate.

BENZOTHIAZYL DISULFIDE CURE

Benzothiazyl disulfide acts as a mild oxidizing agent for paraquinone dioxime because of the cleavage of the disulfide to form two mercaptan molecules. Apparently, the conversion of the dioxime to the nitroso group brought about by the loss of a hydrogen atom results in the same type of vulcanization mechanism as for the paraquinone dioxime cure, but the reaction is not as rapid. Sulfur may be added only to improve aging resistance. Other materials may be added but the preferred parts of constituents are as follows: per 100 parts of polymer, 1.0 to 8.0 parts paraquinone dioxime and 0.5 to 4.0 parts sulfur.

ZINC OXIDE CURE

In halogenated butyl rubber, zinc oxide is a suitable cure. Apparently there is a carbon-carbon linkage in the rubber formed by the removal of halogen atoms or by reaction of halogen atoms with zinc. Ultra accelerators, e.g., tetramethyl thiuram disulfide, can also be used in conjunction with the zinc oxide and a faster cure can be provided in the presence of the halogen atoms.

The preferred parts per 100 parts of rubbery polymer are as follows: 3 to 10 parts zinc oxide and 0 to 5 parts tetramethyl thiuram disulfide. Other materials may be added which include fillers, e.g., carbon black; softeners, e.g., stearic acid. The amount of dicyclopentadiene added to this third method for any of the above cure systems will be in the range of 2 to 20 parts per 100 parts of rubber.

The rubber, e.g., butyl rubber can be cured either before or after the addition of dicyclopentadiene. Any method can be employed as steam, pressure, or mold curing. A particularly satisfactory method is to cure the rubbery polymer in molds at a temperature ranging from 100° C.

to 200° C. for a time interval ranging from 5 minutes to 5 hours.

Thus, in accordance with this invention, a product can be prepared which has increased ozone resistance and overcomes the disadvantages of previous methods. For example, the product will not wear off or crack as is the case with the wax additive. Also, the product of this invention will not stain other items, which is a disadvantage for the use of secondary aromatic amines. Corrosion will not occur, thus overcoming the disadvantage of secondary aromatic phenols. It is possible through the use of this invention not only to increase the ozone resistance but also retain important physical properties, e.g., tensile strength, modulus, and elasticity.

The following examples are submitted to illustrate but not to limit this invention.

Example I

A rubbery copolymer containing 98.5% isobutylene and 1.5% isoprene was chlorinated to produce a product containing 1.2% chlorine in its structure. Rubber A was obtained by adding the following compounds:

| Compounds: | Parts |
|---|---|
| Chlorinated copolymer | 100 |
| Dicyclopentadiene | 4 |
| MPC black[a] | 50 |
| Stearic acid | 1 |
| Zinc oxide | 5 |
| Amberol ST 137[b] | 14 |

[a] Carbon black.
[b] Alkali catalyst reaction product of 1 mol 4-octyl phenol and 2 mol formaldehyde.

The above compounding was accomplished by subjecting the chlorinated copolymer to a mill mixing. All compounding ingredients were added while keeping the mill rolls cool (75° F.). The compounded polymer was then cured in molds at a temperature of 307° F. for 60 minutes.

The characteristics of Rubber A were compared to Control A which was the same as Rubber A without the dicyclopentadiene additive:

|  | Tensile strength, p.s.i. | Modulus at 300% elongation, p.s.i. | Elongation, percent |
|---|---|---|---|
| Rubber A | 2,570 | 1,280 | 520 |
| Control A | 2,610 | 2,275 | 360 |

0.2% O₃ EXPOSURE

|  | Minutes to— | | Total time hrs. | After O₃ test | | |
|---|---|---|---|---|---|---|
|  | Crack | Break |  | Tensile strength | Modulus | Elongation |
| Rubber A | -------- | -------- | 6 | 2,530 | 1,180 | 520 |
| Control A | 230 | 331 | -------- | -------- | -------- | -------- |

It is thus evident that the addition of dicyclopentadiene results in a compounded rubber which is able to withstand an exposure of 0.2% ozone for longer than 6 hours.

Example II

A rubbery copolymer containing 98.5% isobutylene and 1.5% isoprene was chlorinated to produce a product containing 1.2% chlorine in its structure. Rubber B was obtained by adding the following compounds:

| Compounds: | Parts |
|---|---|
| Chlorinated copolymer | 100 |
| SRF black[a] | 50 |
| Stearic acid | 1 |
| Zinc oxide | 5 |
| Dicyclopentadiene | 4 |

[a] Carbon black.

The above compounding and curing were accomplished by a similar procedure described in Example I.

The characteristics of this Rubber B were compared to Control B which was the same as Rubber B without the dicyclopentadiene additive.

|  | Tensile strength, p.s.i. | Modulus at 300% elongation, p.s.i. | Elongation, percent |
|---|---|---|---|
| Rubber B | 1,780 | 890 | 550 |
| Control B | 1,930 | 860 | 540 |

0.2% O₃ EXPOSURE

|  | Minutes to— | | Total time hrs. | After O₃ test | | |
|---|---|---|---|---|---|---|
|  | Crack | Break |  | Tensile strength | Modulus | Elongation |
| Rubber B | -------- | -------- | 6 | 1,500 | 740 | 470 |
| Control B | 284 | -------- | 6 | 725 | 650 | 320 |

No cracks were produced when the dicyclopentadiene was added to the rubber. Physical properties were retained as a result of this cure system.

Example III

A rubbery copolymer containing 98.5% isobutylene and 1.5% isoprene was chlorinated to produce a product containing 1.2% chlorine in its structure. Rubber C was obtained by adding the following compounds:

| Compounds: | Parts |
|---|---|
| Chlorinated copolymer | 100 |
| SRF black | 50 |
| Dicyclopentadiene | 4 |
| Stearic acid | 1 |
| Zinc oxide | 5 |
| Antioxidant 2246[a] | 1 |
| Tuads[b] | 1 |

[a] 2,2'-methylene (4-methyl-6-tertiary butyl) phenol.
[b] Tetramethyl thiuram disulfide, accelerator.

The above compounding and curing were accomplished by a similar procedure described in Example I.

The characteristics of this Rubber C were compared to Control C which was the same as Rubber C without the dicyclopentadiene additive.

|  | Tensile strength, p.s.i. | Modulus at 300% elongation, p.s.i. | Elongation, percent |
|---|---|---|---|
| Rubber C | 2,120 | 1,150 | 500 |
| Control C | 1,900 | 1,250 | 480 |

0.2 O₃ EXPOSURE

|  | Minutes to— | | Total time hrs. | After O₃ test | | |
|---|---|---|---|---|---|---|
|  | Crack | Break |  | Tensile strength | Modulus | Elongation |
| Rubber C | 315 | 346 | -------- | -------- | -------- | -------- |
| Control C | 137 | 145 | -------- | -------- | -------- | -------- |

The chlorinated rubber was able to withstand a longer exposure to ozone as a result of the addition of dicyclopentadiene. The physical properties of the rubber with or without dicyclopentadiene were about the same.

Example IV

A rubbery copolymer containing 98.5% isobutylene and 1.5% isoprene was brominated to result in a product containing 2.1% bromine in its structure. Rubber D is obtained by adding the following compounds:

| Compounds: | Parts |
|---|---|
| Brominated copolymer | 100 |
| SRF black | 50 |
| Stearic acid | 1 |
| Zinc oxide | 5 |
| Dicyclopentadiene | 4 |

The above compounding and curing were accomplished by a similar procedure described in Example I.

The characteristics of Rubber D were compared to Control D which was the same as Rubber D without the dicyclopentadiene additive.

|  | Tensile strength, p.s.i. | Modulus at 300% elongation, p.s.i. | Elongation, percent |
|---|---|---|---|
| Rubber D | 2,090 | 910 | 490 |
| Control D | 2,110 | 1,250 | 490 |

0.2% O₃ EXPOSURE

|  | Minutes to— | | Total time hrs. | After O₃ test | | |
|---|---|---|---|---|---|---|
|  | Crack | Break |  | Tensile strength | Modulus | Elongation |
| Rubber D |  |  | 6 | 2,100 | 740 | 520 |
| Control D | 251 | 269 |  |  |  |  |

The addition of dicyclopentadiene has produced a rubber which was able to withstand an exposure to 0.2% ozone for 6 hours without cracking or breaking. The tensile strength of the rubber was about the same as the control.

Example V

A rubbery copolymer containing 98.5% isobutylene and 1.5% isoprene was brominated to result in a product containing 2.1% bromine in its structure. Rubber E was obtained by adding the following compounds:

| Compounds: | Parts |
|---|---|
| Brominated copolymer | 100 |
| SRF black | 50 |
| Stearic acid | 1 |
| Zinc oxide | 1 |
| Antioxidant 2246 | 1 |
| Tuads | 1 |
| Dicyclopentadiene | 4 |

The above compounding and curing were accomplished by a similar procedure described in Example I.

The characteristics of Rubber E were compared to control E which was the same as Rubber E without the dicyclopentadiene additive.

|  | Tensile strength, p.s.i. | Modulus at 300% elongation, p.s.i. | Elongation, percent |
|---|---|---|---|
| Rubber E | 2,045 | 1,270 | 490 |
| Control E | 1,895 | 1,250 | 480 |

0.2% O₃ EXPOSURE

|  | Minutes to— | | Total time hrs. | After O₃ test | | |
|---|---|---|---|---|---|---|
|  | Crack | Break |  | Tensile strength | Modulus | Elongation |
| Rubber E |  |  | 6 | 980 | 650 | 300 |
| Control E | 92 | 94 |  |  |  |  |

Neither cracking nor breaking occurred in the rubber compounded with dicyclopentadiene which was exposed to 0.2% ozone for 6 hours. Physical properties were retained through the utilization of this cure system.

Example VI

A rubbery copolymer containing 98.5% isobutylene and 1.5% isoprene was compounded as follows to provide Rubbers A, B, C, D, and E.

| Compound | A | B | C | D | E |
|---|---|---|---|---|---|
| Copolymer |  |  | 100 |  |  |
| Kosmobile-S-66 ᵃ |  |  |  | 51 |  |
| Stearic acid |  |  | 1 |  |  |
| Zinc oxide |  |  | 5 |  |  |
| Dicyclopentadiene |  |  | 5 | 5 | 5 |
| Sulfur | 1 | 2 | 1 | 2 | 4 |
| Tuads | 1.2 | 2.4 | 1.2 | 2.4 | 2.4 |

ᵃ Carbon black (MCP).

The compound and curing were accomplished by a similar procedure described in Example I.

The characteristics of these compounded and cured rubbers were compared.

|  | A | B | C | D | E |
|---|---|---|---|---|---|
| Modulus | 870 | 1,255 | 190 | 435 | 850 |
| Tensile | 3,165 | 2,960 | 1,490 | 2,615 | 2,855 |
| Elongation | 675 | 560 | 1,050 | 825 | 645 |

0.2% O₃ EXPOSURE

|  | A | B | C | D | E |
|---|---|---|---|---|---|
| Minutes to crack | 22 | 36 | 1,200 | 392 | 160 |
| Minutes to break | 31 | 45 | 1,200 | 410 | 200 |

The above data indicate that dicyclopentadiene increases ozone resistance.

Example VII

A rubbery copolymer containing 98.5% isobutylene and 1.5% isoprene was compounded to produce Rubbers H, I, J, K, and L. Rubber H was formulated as follows:

| Compounds: | Parts |
|---|---|
| Copolymer | 100 |
| MPC black | 50 |
| Zinc oxide | 5 |
| PBN | 0.2 |
| Zinc stearate | 1 |
| Sulfur | 1 |
| Tuads | 1.2 |
| Dicyclopentadiene | 2 |

Rubber I was formulated as follows:

| Compounds: | Parts |
|---|---|
| Copolymer | 100 |
| MPC black | 50 |
| Zinc oxide | 5 |
| Stearic acid | 1 |
| DOTG ᵃ | 1.5 |
| Sulfur | 2 |
| Tuads | 1.5 |
| Dicyclopentadiene | 2 |

ᵃ Diorthotolyl guanidine, accelerator.

Rubber J was formulated as follows:

| Compounds: | Parts |
|---|---|
| Copolymer | 100 |
| MPC black | 50 |
| Zinc oxide | 5 |
| PBN | 0.2 |
| Zinc stearate | 1 |
| Sulfur | 1 |
| Tuads | 1.2 |
| Dicyclopentadiene | 5 |

Rubber K was formulated as follows:

Compounds: Parts
- Copolymer — 100
- MPC black — 50
- Zinc oxide — 5
- Zinc stearate — 1
- Lead oxide — 5
- Sulfur — 2
- Tuads — 1.5
- Dicyclopentadiene — 5

Rubber L was formulated as follows:

Compounds: Parts
- Copolymer — 100
- MPC black — 50
- Zinc oxide — 5
- Stearic acid — 1
- DOTG — 1.5
- Sulfur — 2
- Tuads — 1.5
- Dicyclopentadiene — 5

Banbury mixing was used to incorporate MPC black, zinc oxide, PBN, and zinc stearate. Other ingredients added on cold mill (75° F.). The compounded rubber was then cured in a mold at 307° F. for 60 minutes.

The characteristics of Rubbers H, I, J, K, and L are compared to Control H which was the same as Rubber H without the dicyclopentadiene additive.

|  | Tensile strength, p.s.i. | Modulus at 300% elongation, p.s.i. | Elongation, percent |
| --- | --- | --- | --- |
| Rubber H | 3,200 | 635 | 720 |
| Rubber I | 1,910 | 150 | 1,035 |
| Rubber J | 2,060 | 220 | 965 |
| Rubber K | 2,240 | 270 | 875 |
| Rubber L | 1,070 | 100 | 1,235 |
| Control H | 2,925 | 1,015 | 570 |

0.2% $O_3$ EXPOSURE

|  | Minutes to— | | Total time hrs. | After $O_3$ test | | |
| --- | --- | --- | --- | --- | --- | --- |
|  | Crack | Break |  | Tensile strength | Modulus | Elongation |
| Rubber H | 122 | 133 |  |  |  |  |
| Rubber I |  |  | 6 | 970 | 100 | 1,040 |
| Rubber J |  |  | 6 | 2,150 | 225 | 970 |
| Rubber K |  |  | 6 | 2,190 | 290 | 790 |
| Rubber L |  |  | 6 | Unknown | 70 | <1,300 |
| Control H | 55 | 59 |  |  |  |  |

From the above data, it is clear that dicyclopentadiene increases the ozone resistance in Rubbers H, I, J, K, and L.

*Example VIII*

A rubbery copolymer containing 98.5% isobutylene and 1.5% isoprene was compounded to produce Rubber M. Rubber M was obtained as follows:

Compounds: Parts
- Copolymer — 100
- MPC black — 50
- Zinc oxide — 5
- Zinc stearate — 1
- Red lead [a] — 9
- Dibenzo GMF [b] — 6
- Sulfur — 1.5
- Dicyclopentadiene — 5

[a] PbO.
[b] Paraquinone dioxime benzoate.

Banbury mixing was used to incorporate MPC black, zinc oxide, PBN, and zinc stearate. Other ingredients added on cold mill (75° F.). The compounded rubber was then cured in a mold at 307° F. for 60 minutes.

The characteristics of Rubber M were compared to Control M which was the same as Rubber M without the dicyclopentadiene additive.

|  | Tensile strength, p.s.i. | Modulus at 300% elongation, p.s.i. | Elongation, percent |
| --- | --- | --- | --- |
| Rubber M | 2,240 | 1,290 | 450 |
| Control M | 2,380 | 1,540 | 445 |

0.2% $O_3$ EXPOSURE

|  | Minutes to— | | Total time hrs. | After $O_3$ test | | |
| --- | --- | --- | --- | --- | --- | --- |
|  | Crack | Break |  | Tensile strength | Modulus | Elongation |
| Rubber M |  |  | 6 | 1,495 | 1,420 | 310 |
| Control M | 121 | 123 |  |  |  |  |

The addition of dicyclopentadiene has produced a compound rubber which was able to withstand an exposure of 0.2% ozone for 6 hours without cracking and without breaking. The physical properties were also retained with the utilization of this cure system.

*Example IX*

A rubbery copolymer containing 98.5% isobutylene and 1.5% isoprene was compounded to produce Rubber N. Rubber N was obtained as follows:

Compounds: Parts
- Copolymer — 100
- Zinc oxide — 5
- PBN — 0.2
- Zinc stearate — 1
- Sulfur — 1
- Tuads — 1.2
- Dicyclopentadiene — 4

Banbury mixing was used to incorporate zinc oxide, PBN, and zinc stearate. Other ingredients added on cold mill (75° F.). The compounded rubber was then cured in a mold at 307° F. for 60 minutes.

The characteristics of Rubber N were compared to Control N which was the same as Rubber N without the dicyclopentadiene additive.

|  | Tensile strength, p.s.i. | Modulus at 300% elongation, p.s.i. | Elongation, percent |
| --- | --- | --- | --- |
| Rubber N | 515 | 70 | 1,800 |
| Control N | 3,535 | 680 | 720 |

0.2% $O_3$ EXPOSURE

|  | Minutes to— | | Total time hrs. | After $O_3$ test | | |
| --- | --- | --- | --- | --- | --- | --- |
|  | Crack | Break |  | Tensile strength | Modulus | Elongation |
| Rubber N |  |  | 48 | 375 | 75 | 1,125 |
| Control N | 20 | 20 |  |  |  |  |

Dicyclopentadiene has increased the ozone resistance of the rubbery compound.

Example X

A rubbery copolymer containing 98.5% isobutylene and 1.5% isoprene was compounded as follows:

| Compound: | Parts |
|---|---|
| Copolymer | 100 |
| FEF black [a] | 30 |
| SRF black | 80 |
| Zinc oxide | 5 |
| Petrolatum | 10 |
| Sulfasan R [b] | 1.25 |
| Spider sulfur [c] | 1.25 |
| TMTDS [d] | 1.5 |
| MBT [e] | 2 |

[a] Carbon black (furnace black).
[b] Morpholine disulfide, nonblooming sulfur donor.
[c] Fine particle size, better dispersion of sulfur.
[d] Tetramethyl thiuram disulfide, accelerator.
[e] Mercapto benzo thiazole ("Captax").

The following additional materials were compounded with the above to produce Rubbers O, P, Q, R, S, T, U, and V.

| Rubber | Compounds | Parts |
|---|---|---|
| O | Dicyclopentadiene | 1 |
| P | do | 3 |
| Q | Dimethylcyclopentadiene | 1 |
| R | do | 3 |
| S | Maleic anhydride | 1 |
| T | do | 3 |
| U | 80% butadiene-20% styrene polymeric oil | 1 |
| V | do | 3 |

Banbury mixing was used to incorporated carbon black, zinc oxide, MBT, and zinc stearate. Other ingredients added on cold mill (75° F.). The compounded rubber was then cured in a mold at 307° F. for 60 minutes.

In the following table, the characteristics of Rubbers O, P, Q, R, S, T, U, and V are compared to Control R which is the same as all of the rubbers without the dicyclopentadiene, dimethylcyclopentadiene, maleic anhydride, or butadiene-styrene polymeric oil additives.

|  | Tensile strength, p.s.i. | Modulus at 300% elongation, p.s.i. | Elongation, percent | 0.2% $O_3$ exposure, minutes to— | |
|---|---|---|---|---|---|
|  |  |  |  | Crack | Break |
| Rubber O | 965 | 710 | 545 | 21 | 31 |
| Rubber P | 895 | 480 | 655 | 127 | 143 |
| Rubber Q | 975 | 770 | 490 | 44 | 60 |
| Rubber R | 945 | 450 | 700 | 154 | 360 |
| Rubber S | 1,095 | 900 | 470 | 16 | 18 |
| Rubber T | 970 | 600 | 590 | 7 | 9 |
| Rubber U | 1,235 | 1,230 | 300 | 6 | 7 |
| Rubber V | 1,175 | 1,050 | 355 | 3 | 4 |
| Control R | 975 | 960 | 380 | 63 | 73 |

The above data show that ozone resistance is increased by the addition of above 1 part of dicyclopentadiene or dimethyl cyclopentadiene, but is decreased by the addition of maleic anhydride or butadiene-styrene polymeric oil.

Example XI

A rubbery copolymer containing 98.5% isobutylene and 1.5% isoprene was compounded to produce Rubber W. Rubber W was obtained as follows:

| Compounds: | Parts |
|---|---|
| Copolymer | 100 |
| MPC black | 50 |
| Zinc oxide | 5 |
| PBN | 0.2 |
| Zinc stearate | 1 |
| Sulfur | 1 |
| Tuads | 1.2 |

Banbury mixing was used to incorporate MPC black, zinc oxide, PBN, and zinc stearate. Other ingredients added on cold mill (75° F.). The compounded rubber was then cured in a mold at 307° F. for 60 minutes.

After Rubber W was cured, it was immersed into a solution containing 100% dicyclopentadiene for 3 hours. At the end of this time, the rubber absorbed dicyclopentadiene to produce a swollen rubber with 10% dicyclopentadiene in its structure. Room temperature and atmospheric pressure were employed in this process. The immersed rubber was dried by exposure to air at room temperature for 16 hours.

The characteristics of Rubber W were compared to Control W which was the same as Rubber W without the immersion in dicyclopentadiene.

|  | Tensile strength, p.s.i. | Modulus at 300% elongation, p.s.i. | Elongation, percent |
|---|---|---|---|
| Rubber W | 2,530 | 590 | 680 |
| Control W | 3,350 | 960 | 690 |

0.2% $O_3$ EXPOSURE

|  | Minutes to— | | Total time hrs. | After $O_3$ test | | |
|---|---|---|---|---|---|---|
|  | Crack | Break |  | Tensile strength | Modulus | Elongation |
| Rubber W |  |  | 6 | 2,340 | 590 | 650 |
| Control W | 30 | 35 |  |  |  |  |

The ozone resistance of the rubber is increased by immersing it after curing in a solution of dicyclopentadiene.

Example XII

A rubbery copolymer (neoprene) containing 100% chloroprene was compounded with 5 parts of dicyclopentadiene per 100 parts of the polymer. The compounding was performed as in Example I. The compounded polymer was then cured in molds at a temperature of 307° F. for various periods of time.

Characteristics of this compounded rubber were compared to a control without the dicyclopentadiene additive.

RESULTS FOR 10-MINUTE CURING

|  | Compounded rubber | Control |
|---|---|---|
| Tensile strength | 3,020 | 3,370 |
| Modulus | 2,070 | 2,820 |
| Elongation | 480 | 405 |
| Minutes to break after exposure to 0.2% $O_3$ | 11.5 | 8 |

RESULTS FOR 20-MINUTE CURING

|  | Compounded rubber | Control |
|---|---|---|
| Tensile strength | 2,880 | 3,610 |
| Modulus | 2,150 | 2,920 |
| Elongation | 415 | 400 |
| Minutes to break after exposure to 0.2% $O_3$ | 11 | 7.25 |

RESULTS FOR 40-MINUTE CURING

|  | Compounded rubber | Control |
|---|---|---|
| Tensile strength | 2,130 | 3,590 |
| Modulus | 2,590 | 3,450 |
| Elongation | 410 | 325 |
| Minutes to break after exposure to 0.2% $O_3$ | 13.5 | 7.75 |

The addition of dicyclopentadiene to neoprene increased the time of exposure to ozone before breakage occurred. Therefore, neoprene with dicyclopentadiene has increased ozone resistance.

The above examples illustrate that the addition of dimers of cyclic diene hydrocarbons, e.g., dicyclopentadiene and dimethylcyclopentadiene, to unsaturated rubbery polymers, e.g., butyl rubber and neoprene, improves the ozone resistance of the polymers. It is critical to employ between 2 and 20% of the dimer in the rubber. However, the cyclic diene dimer can be incorporated in the rubber before and/or after it is cured.

Having described the general nature and specific embodiments of the present invention, the true scope is now particularly pointed out in the appended claims.

What is claimed is:

1. A vulcanizate which comprises 100 parts of an unvulcanized rubbery polymer selected from the group consisting of butyl rubber copolymer of major $C_4$ to $C_7$ isoolefin with minor $C_4$ to $C_{10}$ diolefin, halogenated butyl rubber copolymer of major $C_4$ to $C_7$ isoolefin with minor $C_4$ to $C_{10}$ diolefin, and polychloroprene, which has been compounded with 2 to 20 parts of a dimer of a cyclic diene hydrocarbon selected from the group consisting of dicyclopentadiene and dimethylcyclopentadiene and subsequently cured at a temperature between 100 and 200° C. for 5 minutes to 5 hours to provide said vulcanizate therefrom with increased ozone resistance.

2. The vulcanizate according to claim 1 in which the curing is performed in the presence of a compound selected from the group consisting of paraquinone dioxime, paraquinone dioxime dibenzoate, and zinc oxide.

3. The vulcanizate according to claim 1 in which the rubbery polymer is a butyl rubber copolymer of a major $C_4$ to $C_7$ isoolefin with minor $C_4$ to $C_{10}$ diolefin.

4. The vulcanizate according to claim 1 in which the rubbery polymer is a halogenated butyl rubber copolymer of major $C_4$ to $C_7$ isoolefin with minor $C_4$ to $C_{10}$ diolefin.

5. The vulcanizate according to claim 1 in which the rubbery polymer is polychloroprene.

6. A vulcanizate which comprises 100 parts of an unvulcanized rubbery copolymer of 70 to 99 parts by weight isobutylene with 30 to 0.5 parts by weight of isoprene which has been compounded with 2 to 20 parts of dicyclopentadiene and subsequently cured at a temperature between 100 and 200° F. for 5 minutes to 5 hours to provide said vulcanizate therefrom with increased ozone resistance.

7. A vulcanizate which comprises 100 parts of an unvulcanized rubbery copolymer of 70 to 99 parts by weight isobutylene with 30 to 0.5 parts by weight of isoprene which has been compounded with 2 to 20 parts of dimethylcyclopentadiene and subsequently cured at a temperature between 100 and 200° F. for 5 minutes to 5 hours to provide said vulcanizate therefrom with increased ozone resistance.

8. A process which comprises compounding 100 parts of an unvulcanized rubbery polymer selected from the group consisting of butyl rubber copolymer of major $C_4$ to $C_7$ isoolefin with minor $C_4$ to $C_{10}$ diolefin, halogenated butyl rubber copolymer of major $C_4$ to $C_7$ isoolefin with minor $C_4$ to $C_{10}$ diolefin, and polychloroprene, with 2 to 20 parts of a dimer of a cyclic diene hydrocarbon selected from the group consisting of dicyclopentadiene and dimethylcyclopentadiene; and subsequently curing at a temperature between 100 and 200° C. for 5 minutes to 5 hours to provide a vulcanizate therefrom with increased ozone resistance.

9. The process according to claim 8 in which the curing is conducted in the presence of a compound selected from the group consisting of paraquinone dioxime, paraquinone dioxime dibenzoate, and zinc oxide.

10. The process according to claim 8 in which the rubbery polymer is a butyl rubber copolymer of major $C_4$ to $C_7$ isoolefin with minor $C_4$ to $C_{10}$ diolefin.

11. The process according to claim 8 in which the rubbery polymer is a halogenated butyl rubber copolymer of major $C_4$ to $C_7$ isoolefin with minor $C_4$ to $C_{10}$ diolefin.

12. The process according to claim 8 in which the rubbery polymer is polychloroprene.

13. A process which comprises compounding 100 parts of an unvulcanized rubbery copolymer of 70 to 99.5 parts of isobutylene with .5 to 30 parts of isoprene with 2 to 20 parts of dicyclopentadiene; and subsequently curing at a temperature between 100 and 200° C. for 5 minutes to 5 hours to provide a vulcanizate therefrom with increased ozone resistance.

14. A process which comprises compounding 100 parts of an unvulcanized rubbery copolymer of 70 to 99.5 parts of isobutylene with .5 to 30 parts of isoprene with 2 to 20 parts of dimethylcyclopentadiene; and subsequently curing at a temperature between 100 and 200° C. for 5 minutes to 5 hours to provide a vulcanizate therefrom with increased ozone resistance.

References Cited in the file of this patent

Le Beau, Rubber Age, Vol. 68, No. 1, October 1950, pages 49–56.

Taft et al.: Rubber Age, vol. 75, No. 6, September 1954, pages 838–840.